United States Patent [19]
Conway, Jr.

[11] 3,842,664
[45] Oct. 22, 1974

[54] THETA-SHAPED TEST SPECIMEN FOR COMPOSITE MATERIALS

[75] Inventor: Joseph C. Conway, Jr., State College, Pa.

[73] Assignee: The United States of America as represented by the Secretary of the Navy, Washington, D.C.

[22] Filed: Apr. 5, 1973

[21] Appl. No.: 348,382

[52] U.S. Cl............... 73/88 R, 73/88 A, 73/95
[51] Int. Cl. ............................................. G01n 3/08
[58] Field of Search .... 73/88 A, 95, 100, 94, 141 A

[56] References Cited
UNITED STATES PATENTS
3,151,480  10/1964  Schultz .......................... 73/141 A
3,386,282  6/1968  Jacobson ..................... 73/141 A X
3,611,797  10/1971  Pugnaire ......................... 73/141 A Primary Examiner—Jerry W. Myracle
Attorney, Agent, or Firm—R. S. Sciascia; P. Schneider

[57] ABSTRACT

A configuration for a specimen for testing the stress-related properties of materials, the configuration being a ring with a diametral neck. This configuration is especially useful for testing materials taken from or doubly curved samples of wound materials such as fiber-reinforced composites.

5 Claims, 8 Drawing Figures

PATENTED OCT 22 1974　　　　　　　　3,842,664

3,842,664

THETA-SHAPED TEST SPECIMEN FOR COMPOSITE MATERIALS

BACKGROUND OF THE INVENTION

This invention relates to specimens for testing the properties of materials and especially to a particular shape for a single, unitary piece of a test specimen.

Prior studies have utilized conventional tensile specimens to obtain material properties and the effects of stress concentrators in fiber-reinforced, composite materials. Such tensile specimens are inadequate with respect to composite materials since: (1) they must usually be cut from a singly or doubly curved composite specimen, since fiber-reinforced materials are usually fabricated by a winding process; and (2) they must be of sufficient length to prevent localized stresses imposed by the loading grips from reaching the neck of the specimen. The necessary length and curvature of the tensile specimen result in rather severe end moments upon load application and it becomes impossible to obtain a state of uniaxial tension over the neck of the specimen. Furthermore the required specimen length results in appreciable viscoelastic creep, especially for the case of constant applied load.

SUMMARY OF THE INVENTION

The objects and advantages of the present invention are obtained by forming a test specimen comprising a single, unitary piece for determining the stress-related properties of a given material in the shape of the Greek letter "theta" ($\theta$).

An object of this invention is to improve the shape of a test specimen which is used for determining the stess-related properties of materials, thereby improving the stress/strain characteristics of the test specimen.

Another object is to obtain a state of uniaxial tension over the neck of a material test specimen, especially one fabricated from a singly or doubly curved material.

A further object is to provide a material specimen with reduced tendency to viscoelastic creep.

Yet another object is to provide an improved configuration for testing the stress-related properties of fiber-reinforced materials.

Other objects, advantages and novel features of the present invention will become apparent from the following detailed description of the invention when considered in conjunction with the accompanying drawing.

DETAILED DESCRIPTION OF THE INVENTION

Figure 1A:
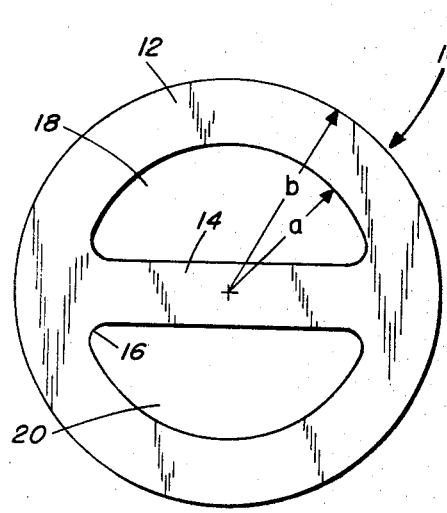
FIG. 1A is a plan view of a test specimen shaped in accordance with the invention.

FIG. 1A shows in plan view a test specimen 10, made in accordance with the present invention, for determining the stress-related properties of the material from which the specimen 10 is fabricated. Stress-related properties of materials are characteristics such as the Modulus of Elasticity, Poisson's Ratio and, if the material is a fiber-reinforced composite, the stress concentration for a circular penetration of the composite as a function of fiber orientation.

The test specimen 10 is formed from the material in a configuration which is substantially the form of the Greek Letter $\theta$ (theta). The specimen is a ring 12 of inner radius $a$ and outer radius $b$, with a neck 14 extending diamentrally across the ring 12. The points 16 at which the neck 14 meets the inner edge of the ring 12 are curved to form a slight flare at each side of the neck.

Figure 1B:
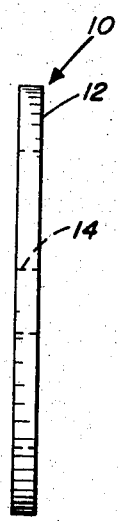
FIG. 1B is a side view of the specimen shown in FIG. 1A.

FIG. 1B shows the specimen in side view and it is evident that the specimen is shaped like a disc with excisions 18 and 20.

Figure 2:
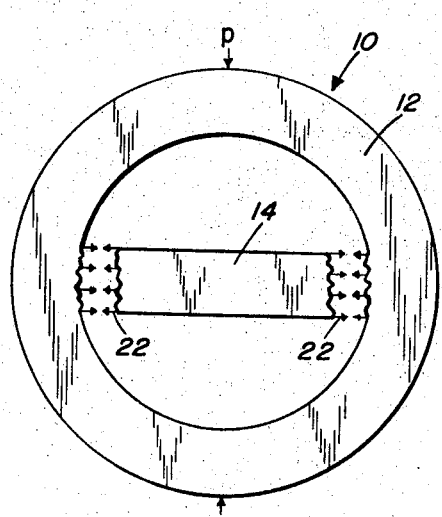
FIG. 2 illustrates loading of the specimen and the stress on the neck section.

FIG. 2 shows the loading of the specimen, the force being applied to along the line $p\,p$, perpendicular to the axis of the neck 14. The arrows 22 at the sides of the neck 14 are intended to indicate that force applied thusly to the ring results in a fairly uniform tensile strain (compressive) at the juncture of the ring and neck sections.

Loading of the neck of the theta specimen can thus be considered in terms of constant strain. The specimen can be cut from a material sample with the neck oriented in any direction. Thus, this specimen shape is particularly useful with fiber-reinforced materials, since the neck may be oriented in any direction relative to fiber direction.

The shape is also very useful with singly or doubly curved materials since specimen dimensions can be adjusted so that imposed bending stresses may be nearly eliminated for curved samples.

For most practical situations, the outside diameter, $b$, will be equal to or less than 5 inches. This is feasible since no major stress singularity exists at the juncture between the ring and neck sections.

Figure 3:
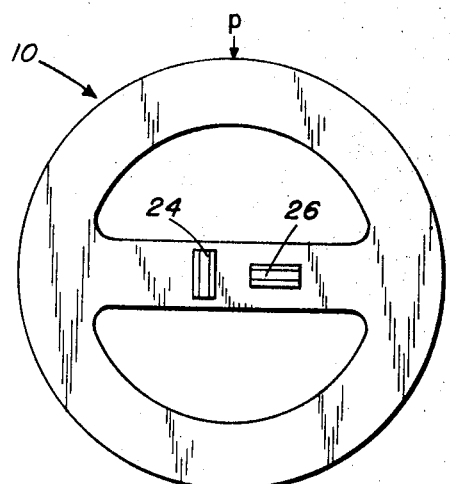
FIG. 3 shows where strain gages may be placed on the neck.

FIG. 3 illustrates possible locations and orientations of strain gages 24 and 26 on the neck section for measuring the strain therein.

Figure 4:
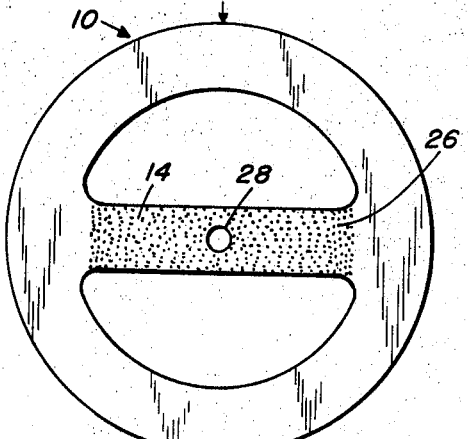
FIGS. 4 and 5 show how stress concentrations around a hole or a notch may be determined.

FIG. 4 shows the neck section 14 coated with a photoelastic coating 26 to show by emitted light the stress around a hole 28 which is drilled in the neck. This type of coating 26 is also useful to show the stress concentrations surrounding notches 30 cut into the neck 14. Other shapes of singularities in the neck can also be investigated by means of the coating or birefringent properties to the neck material itself.

The advantages of the theta-shaped test specimen as compared to currently used shapes are: a small specimen can be used in testing singly or doubly curved composite samples, since induced bending is practically eliminated and complex loading frames and related tooling is unnecessary; viscoelastic creep is greatly reduced; and the specimen may be cut with the neck oriented in any desired manner relative to fiber orientation in the specimen material.

As is well known in mathematics and the art of testing materials, the term "singly curved" relates to the surface of a geometric figure, such as a cylinder or a cone, in which the surface is generated by revolving a straight line about an axis; and the term "doubly curved" relates to the surface of a geometric figure, such as a sphere or an ellipsoid, in which the surface is generated by revolving a curved line about an axis.

Figure 6:
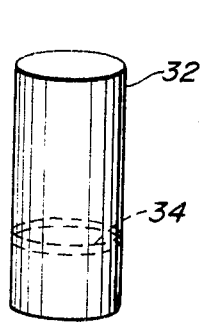
FIG. 6 shows a singly curved sample of test material.
Figure 5:
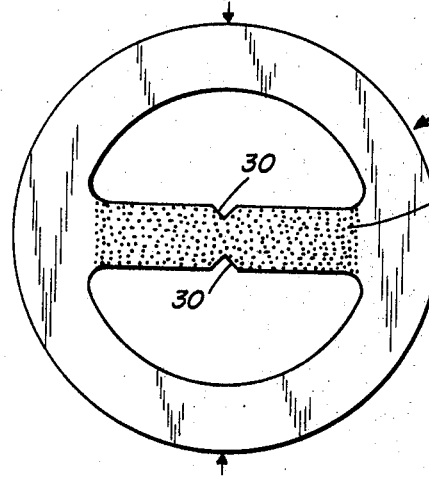

Thus, FIG. 6 shows a sample of test material which is a cylinder 32; cylinders have a singly curved surface. The dotted lines 34 show how the cylinder might be sliced to obtain a test sepcimen.

Figure 7:
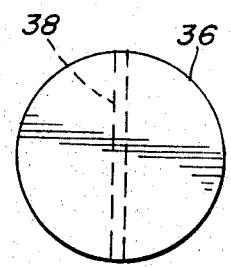
FIG. 7 shows a doubly curved sample of test material.

FIG. 7 shows a sample of test material which is a sphere 36; spheres have a doubly curved surface. The dotted lines 38 show how the sphere might be sliced to obtain a test specimen.

Obviously, many modifications and variations of the present invention are possible in light of the above teachings. It is therefore to be understood that, within the scope of the appended claims, the invention may be practiced otherwise than as specifically described.

What is claimed is:

1. A test specimen for determining the stress-related properties of a material comprising:
a unitary specimen fabricated from a sample of material whose properties are to be determined,
said specimen being substantially formed in the shape of the Greek letter $\theta$ (theta) and being fabricated from a fiber-reinforced composite material, said fibers having an orientation, and the diametral portion of the $\theta$-shaped test specimen being oriented relative to said fibers in order to determine the properties of the test material in a predetermined direction relative to the orientation of said fibers.

2. A test specimen as in claim 1 wherein said specimen is also fabricated from a singly curved sample of test material.

3. A test specimen as in claim 1, wherein said specimen is also fabricated from a doubly curved sample of test material.

4. A test specimen for determining the stress-related properties of a material comprising:
a unitary specimen fabricated from the material whose properties are to be determined,
said specimen being substantially formed in the shape of the Greek letter $\theta$ (theta),
said test specimen being fabricated from a doubly curved sample of test material.

5. A test specimen for determining the stress-related properties of a material comprising:
a unitary specimen fabricated from a sample of material to be tested,
said specimen being in the form of a thin circular ring having a diametral straight section called a "neck," the whole specimen thus being substantially shaped like the Greek letter $\theta$ (theta),
the sides of the neck at its junction with the ring being curved and somewhat flared to meet the curved inner edge of the ring,
said specimen being fabricated from a sample of fiber-reinforced, composite test material.

* * * * *